US005584579A

United States Patent [19]

Asano et al.

[11] Patent Number: 5,584,579

[45] Date of Patent: Dec. 17, 1996

[54] THERMAL DETECTOR

[75] Inventors: Isao Asano, Tokyo; Yoshimi Kawabata, Hachiouji, both of Japan

[73] Assignee: Hochiki Kabushiki Kaisha, Tokyo, Japan

[21] Appl. No.: 405,977

[22] Filed: Mar. 17, 1995

Related U.S. Application Data

[62] Division of Ser. No. 5,889, Jan. 15, 1993, Pat. No. 5,425, 582.

[30] Foreign Application Priority Data

Jan. 31, 1992 [JP] Japan .................................... 4-15703
Mar. 18, 1992 [JP] Japan .................................... 4-60820

[51] Int. Cl.[6] .............................. G08B 17/00; G01K 1/08

[52] U.S. Cl. .......................... 374/208; 374/209; 374/158; 340/584; 340/693

[58] Field of Search .................................... 374/208, 183, 374/209, 158; 340/584, 693; 29/525.1

[56] References Cited

U.S. PATENT DOCUMENTS

| | | | |
|---|---|---|---|
| 4,053,785 | 10/1977 | Lee et al. | 340/785 |
| 4,092,641 | 5/1978 | Bellinghausen et al. | 340/628 |
| 4,381,503 | 4/1983 | Kobayashi | 340/584 |
| 4,388,617 | 6/1983 | Nakanishi et al. | 340/693 |
| 4,694,285 | 9/1987 | Scripps | 340/693 |
| 4,914,425 | 4/1990 | Kaminaka et al. | 340/693 |
| 4,929,093 | 5/1990 | Suzuki et al. | 374/208 |

FOREIGN PATENT DOCUMENTS

| | | | |
|---|---|---|---|
| 405266377 | 10/1993 | Japan | 340/584 |

*Primary Examiner*—Diego F. F. Gutierrez
*Attorney, Agent, or Firm*—Max Fogiel

[57] ABSTRACT

A thermal detector in which an element unit has a heat sensor element such as a, thermistor, sealed into the terminal end portion thereof, for electrically detecting temperature change. A detector body integrates by plastic-forming a pair of fitting members for electrically and mechanically coupling to a detector base. A circuit board is mounted on a circuit accommodation portion inside the detector body. A back side cove is provided for closing and sealing the circuit accommodation portion from the reverse side thereof. Air-tightness of the circuit accommodation portion is thereby secured and it is simplified to make possible automatization. Positioning projections and respective positioning grooves are provided. By respectively fitting these, positioning is achieved of the circuit board to a molded body, the back side cover to the reverse side of the molded body and the outer cover to the lower side of the molded body. In such a positioned state, the back side cover, the circuit board, the molded body and the outer cover are fixed into one body by screwing of the fitting members. Positioning of a plurality of component parts at the time of assembling is simplified thereby to achieve an improvement in working efficiency and assembling precision.

2 Claims, 9 Drawing Sheets

Fig.3
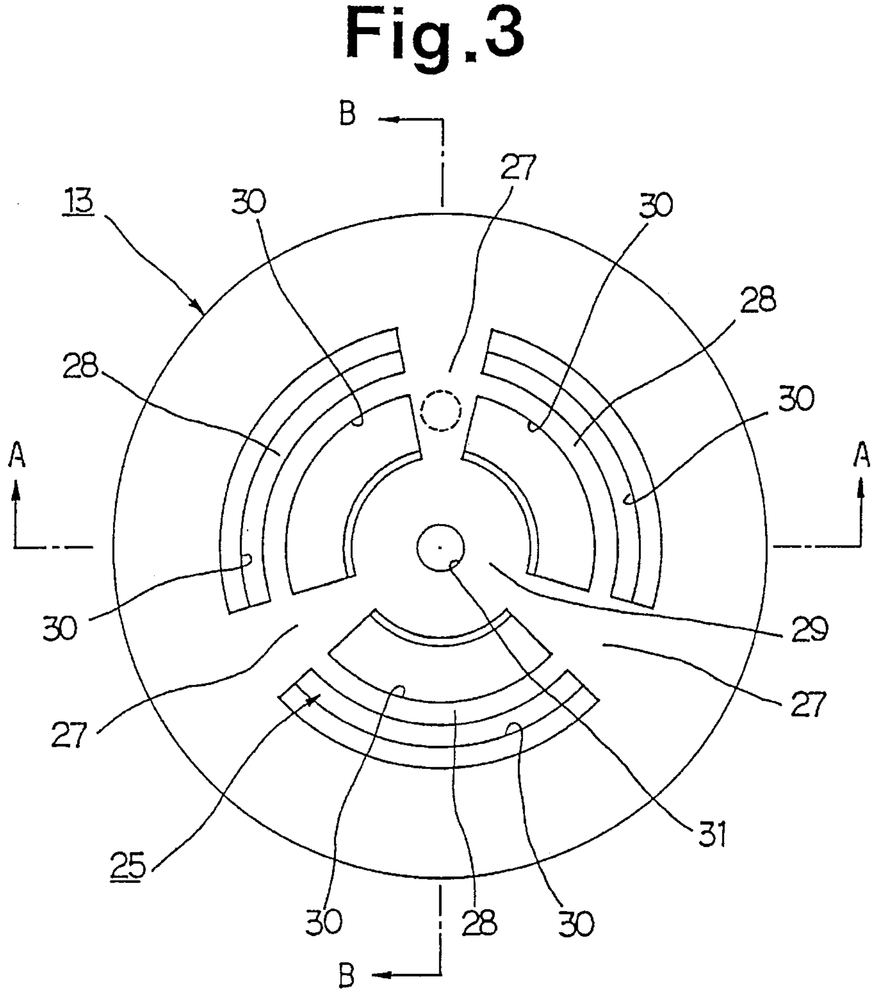
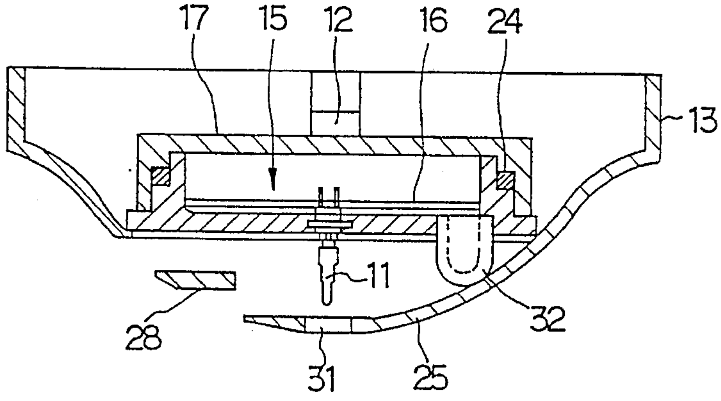
Fig.4

THERMAL DETECTOR

This is a division of application Ser. No. 08/005,889 filed Jan. 15, 1993, now U.S. Pat. No. 5,425,582.

BACKGROUND OF THE INVENTION

1. Field of the Invention

The present invention relates to a thermal detector and a method of producing the same using a semiconductor heat sensor element such as a thermistor, which senses a fire by electrically detecting temperature.

2. Description of the Related Art

Those arrangements, for example disclosed in Japanese Patent Laid-Open Publication No. 1-259494 have been known as this type of thermal detector and its production method.

This type of thermal detector is first provided with a printed circuit board having a heat sensor element and a body for accommodating the printed circuit board. Also, a cover is provided so that the heat sensor element of the printed circuit board mounted on the body is caused to face the outside thereof. It is further constructed to have an inner cover placed between the printed circuit board and the cover, which is screwed to the printed board. The inner cover is provided for the purpose of positioning the heat sensor element which penetrates therethrough and of preventing dust from entering.

For example, FIG. 11 shows a conventially known type of this detector. Referring to FIG. 11, 1 is a heat sensor element using a thermistor or the like of which the resistance value varies according to temperature. This heat sensor element 1 has lead wire connected to a printed circuit board 4, which is incorporated into a circuit accommodation portion 3 of a detector body 2 where the summit thereof is brought to the outside. The heat sensor element 1 and the portion of a hole on the detector body 2 through which the element is brought to the outside are formed into a sealed portion 5, for example, by potting of adhesives or the like. It should be noted that, instead of potting of adhesives, a packing may be used.

A back side cover 6 is mounted on the reverse side of the circuit accommodation portion 3 via a rubber packing 7 or the like. Provided on the reverse side of the back side cover 6, are a pair of fitting members 8 which are electrically and mechanically connected to a detector base.

Mounting of the printed circuit board 4 and the fitting members 8 onto the back side cover 6 is effected by using screws 9 and cylindrical contacting members 10. That is, they are fixed to the back side cover 6 by tightening the screw 9 in the state where the contacting member 8 is placed between the printed circuit board 4 and the fitting member 10.

However, in the construction of such conventional sensor, there are problems, as follows.

Firstly, a conventional sensor is constructed to have an airtight structure by using potting or packing in the state where the heat sensor element 1 connected to the circuit board 4 by thin lead wire, is brought out to the outside thereof so as to keep the airtightness of the circuit accommodation portion 3. For this reason, manual work must be performed, since the lead wire of the heat sensor element 1 is thin and is difficult to be handled. Thus automatization of assembling process thereof is difficult. Further, in the case of potting where adhesives or the like is used, time is also required until it is dried and fixed.

Secondly, mounting of the circuit board 4 and the fitting member 8 with respect to the back side cover 6 is also performed by a manual operation, because the screw 10 is used. Further, a gap occurs at the mounting portion. Airtightness within the detector cannot thus be adequately secured.

Thirdly, in assembling of the body, printed circuit board and cover of a conventional thermal detector, they are fixed by screw 6 in the state where threaded-holes and threaded through holes formed respectively on them are positioned with respect to each other. For this reason, the screwing operation must be performed at the same time of their positioning. Assembling operation of the detector is thus complicated and, in addition, variance in positioning due to the condition of screwing is large. Especially when automatization of assembling work by a robot or the like is attempted, the yield of products is also reduced, since the working process thereof is complicated and requires high positioning accuracy.

SUMMARY OF THE INVENTION

The present invention has been made in view of the above conventional problems and it is an object of the present invention to provide a thermal detector and method of producing the same in which airtightness of a circuit accommodation portion is secured, and positioning of a plurality of parts in assembling work is simplified to improve working efficiency and assembling precision and thereby to make possible automatization thereof. To this end, the present invention is constructed as follows. Note that the reference numerals that are used in the drawings are additionally indicated in the following.

First, the present invention includes an element unit 11 having a heat sensor element 1 such as a thermistor sealed into the terminal end portion thereof for electrically detecting changes in temperature. The element unit 11 is integrally plastic-formed in the state where the terminal end thereof is exposed to the outside. Here, preferably, a pair of fitting members 12 positioned at the inner side thereof for electrically and mechanically coupling the element to a detector base are at the same time integrated thereto as they are plastic-formed. Further, a detector body (having an outer cover 13 and molded body 14) containing these components is included. In addition, it includes: a circuit board 16 mounted on the circuit accommodation portion 15 inside the detector body and having thereon a sensor circuit electrically connected to the element unit 11 and the fitting members 12; and a back side cover 17 for sealing the circuit accommodation portion 15 of the detector body from the back side thereof.

In another aspect, the present invention preferably includes: an element unit 11 having a heat sensor element 1 such as a thermistor sealed into the terminal end portion thereof for electrically detecting changes in temperature; and a detector body 18 to which the terminal end of the element unit 11 is integrated by means of plastic forming in the state where it is exposed to the outside. It further includes a circuit board 16 mounted on a circuit accommodation portion 15 inside the detector body 18 and having thereon a sensor circuit electrically connected to the above element unit and fitting members. In addition to these, it includes a back side cover 17 having a pair of fitting members 12 integrally formed thereon by means of plastic forming for electrically and mechanically coupling it to the detector base, for sealing in the above state the circuit accommodation portion 15 of the detector body 18 from the reverse side thereof.

The back side cover 17 having the fitting members 12 integrally formed thereon by plastic forming, furthermore, has a shield plate 19 internally embedded therein by means of plastic forming, which is electrically connected to one of the fitting members 12.

Furthermore, the element unit 11 comprises: a pair of lead frames 20; a unit body 21 plastic-formed by exposing the two ends of the lead frames 20 to the outside; a heat sensor element 1 projecting at the terminal end of the unit body 21, formed by connecting lead wire to the pair of the lead frames; and a coating material 23 provided to cover the entire portion of the heat sensor element 1 and lead wire 22 that are provided at the terminal end side of the unit body 21.

According to the detector of the present invention having the above construction, an element unit having a heat sensor element and fitting members are previously plastic-formed to be prepared as one component part integrally with a detector body and a back side cover by means of insert molding. Thus, assembling work of the heat sensor element and fitting members onto the detector body becomes unnecessary so that automatization of assembling may be achieved.

Further, since the element unit and the fitting members are integrated to the detector body by means of insert molding, it is possible to further increase airtightness of the circuit accommodation portion so as to greatly improve durability and reliability of the detector.

In another aspect, a thermal detector of the present invention is preferably constructed and manufactured as follows.

First, as its construction, the present invention is directed toward a detector having an assembled structure including component parts placed one upon another in the order of: an outer cover 13, a molded body 14 having a heat sensor element 1 integrally formed thereon projected to the outside; circuit board 16 having a sensor circuit thereon; and a back side cover 17 having fitting members 12. Note that, preferably, it is also directed toward one having a shield case 45.

In a thermal detector as constructed above, the present invention includes: a first positioning projection 110 provided on one of the reverse side of the molded body 14 or the circuit board 16; and a first positioning groove 111 provided on the other, which may be fitted onto the first positioning projection 110.

It further includes: a second positioning projection 112 provided on one of the molded body 14 and the back side cover 17; and a second positioning groove 113 which may be fitted onto the second positioning projection 112.

Furthermore, a third positioning groove 115 is provided on one of the molded body 14 and the outer cover 13. Then, the circuit board 16 is attached to the molded body 14 as they are positioned based on fitting of the first positioning projection 110 and the first positioning groove 111.

In addition, the outer cover 13 is attached to the lower side of the molded body 14 as they are positioned based on the fitting of the third positioning projection 114 and the third positioning groove 115.

In this positioned state, the detector has its construction in which the back side cover 17, the shield case 45, the circuit board 16, the molded body 14 and the outer cover 13 are integrally fixed to each other by screwing of the fitting members 12 with respect to the back side cover 17.

Moreover, the present invention provides method of producing a thermal detector having the above construction, which comprises the following steps:

[Step 1]

The circuit board 16 is temporarily assembled with the molded body 14 by positioning them based on fitting of the first positioning projection 110 and the first positioning groove 111.

[Step 2]

The back side cover 17 having the shield case 45 incorporated thereto is temporarily assembled onto the reverse side of the molded body 14 having the circuit board 16 incorporated thereto by positioning them based on fitting of the second positioning projection 112 and the second positioning groove 113.

[Step 3]

The outer cover 13 is temporarily assembled onto the lower side of the molded body 14 by positioning them based on fitting of the third positioning projection 114 and the third positioning groove 115.

[Step 4]

The back side cover 17, the shield case 45, the circuit board 16, the molded body 14 and the outer cover 13 in their temporarily assembled state are fixed integrally to each other by screws.

According to a thermal detector of the present invention constructed as above, each combination of the body and the circuit board, the body and the back side cover, and the body and the outer cover may be accurately positioned in their temporarily assembled state based on fitting between their respective positioning projections and positioning grooves. After such temporary assembling, the entire portions may thus be assembled and fixed into one through a fixing operation, for example, onto The back side cover by tapping screws of the fitting members while they are kept in their correct relative position. Due to the fact that positioning is separated from, fixing operation based on final screwing, positioning at the time of assembling may be performed simply and accurately. In addition, positioning may be performed at the temporary assembling prior to the screwing operation and screwing may be performed finally after the positioning which is performed as a temporary assembling work. Application of automatic assembling by a robot or the like is thus facilitated and it is possible to constantly obtain a high assembling accuracy, and, in addition, the yield of products may be improved.

BRIEF DESCRIPTION OF THE DRAWINGS

FIG. 3 is a plan view as seen from the bottom side of FIG. 1;

FIG. 4 is a sectional view taken along B—B of FIG. 3;

DESCRIPTION OF THE PREFERRED EMBODIMENTS

Figure 1:
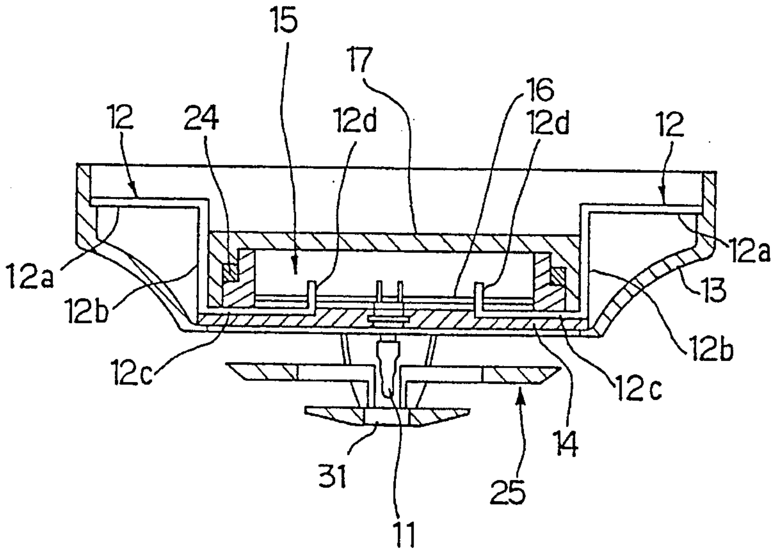
FIG. 1 is a sectional view (taken along A—A of FIG. 3) showing a first embodiment of the present invention.

FIG.1 is a sectional view showing a first embodiment of the present invention.

Referring to FIG. 1, numeral 11 denotes an element unit into the interior of which a heat sensor element such as a thermistor is sealed. The element unit 11 is plastic-formed integrally with a molded body 14 by means of inset molding in the state where the terminal end thereof containing the heat sensor element is projected outward at the center of the molded body 14. Further, a pair of fitting members 12 to be electrically and mechanically coupled to a detector base provided on the ceiling surface are also integrally plastic-formed with the molded body 14 by insert molding.

Each fitting member 12 has a shape bent generally perpendicularly consisting of a horizontal portion 12*a*, a vertical portion 12*b*, a horizontal portion 12*c* and a vertical portion 12*d* extended from outside, in this order. The horizontal portion 12*a* at the upper outside is fitted into a fitting member of the detector base. Further, the inner vertical portion 12*b* is projected into a circuit accommodation portion 15 formed at the interior of the molded body 14 and passes through a circuit board 16 to be soldered thereat.

Such a fitting member 12 is integrated at its horizontal portion 12*c* by insert molding to the molded body 14 when the body is plastic-formed.

A suitable sensor circuit is implemented on the circuit board, which is incorporated into the circuit accommodation portion 15 of the molded body 14. Further, lead terminals on the back of The element unit 11 and the vertical portion 12*d* of the fitting member 12 are fixed by means of soldering to the circuit board 16. A back side cover 17 is mounted on the upper portion of the circuit accommodation portion 15 via an O-ring 24.

The molded body 14 formed in this manner integrally with the element unit 11 and the fitting members 12 is incorporated into an outer cover 13. The outer cover 13 has a protection cover 25 integrally formed thereon, which covers the portion the element unit 11 projecting to the outside.

Figure 2:
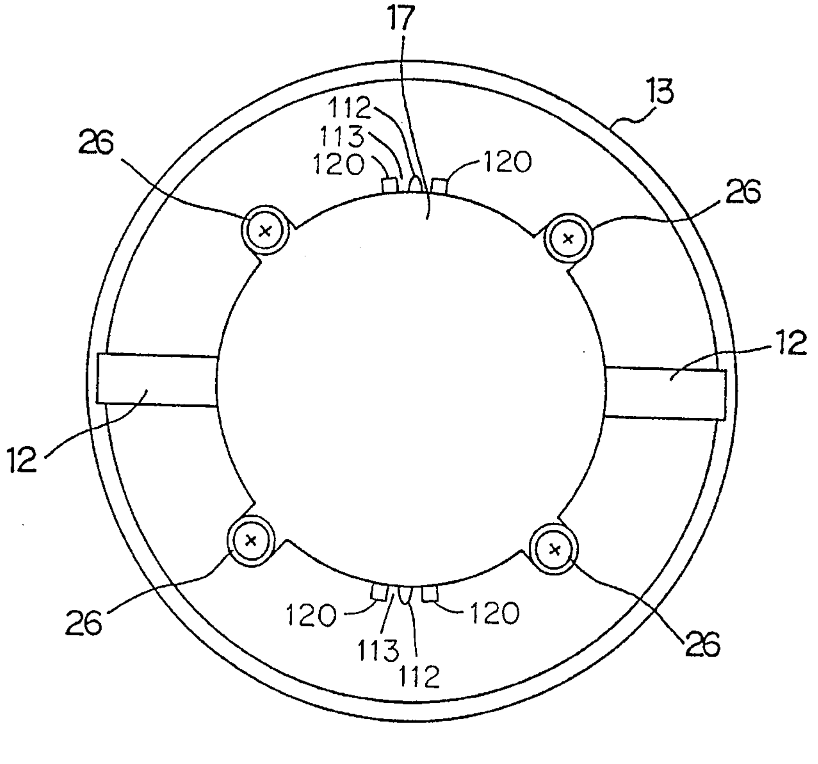
FIG. 2 is a plan view as seen from the top side of FIG. 1.

FIG. 2 is a plan view as seen from the top side of FIG. 1. The back side cover 17 is fixed at four points thereof to the inside of the outer cover 13 by screws 26. Further, the fitting members 12 are positioned horizontally from the two sides of the back side cover 17.

FIG. 3 is a plan view as seen from the bottom side of FIG. 1.

Referring to FIG. 3, provided integrally on the outer cover 13 is a ring-like frame 28 and a center disc portion 29, which is supported by three arm portions 27. Further, vent holes 30 each separated into two stages of upper and lower are opened at three points on the side surface thereof, and a vent hole 31 is opened at the center of the central disc portion 29.

Here, the section taken along A—A of FIG. 3 is the sectional view of FIG. 1

FIG. 4 is a sectional view taken along B—B of FIG. 3, which makes visible the state of the arm portion 27 extended at the lower portion of the outer cover 13. Further, as shown in the figure, a lamp case 31 which is capable of holding an indication lamp inserted from the circuit accommodation portion 15 side is provided on the inner side of one arm portion 27 of the outer cover 13. Naturally, it is not always necessary to provide the lamp case 32.

Figure 5:
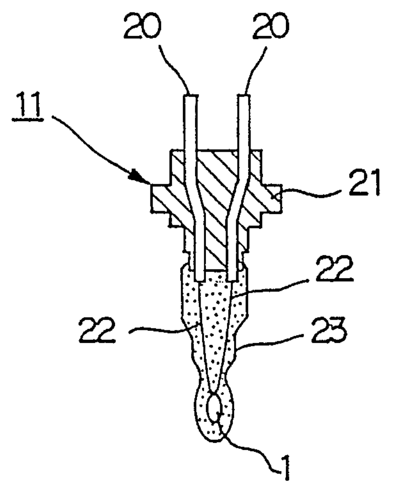
FIG. 5 is a sectional view of an element unit used in the present invention.

FIG. 5 is a sectional view of the element unit 11 as shown in FIGS. 1 and 4.

Referring to FIG. 5, the element unit 11 has a unit body 21. Here, when the unit body 21 is plastic-formed, two lead frames 20 are integrally plastic-formed thereto by means of insert molding. The lead frames 20 are caused to project to the outside at two ends thereof when they are formed onto the unit body 21 so that the upper portion thereof is a connecting portion to the circuit board 16, while the lower side thereof is a connecting portion to the heat sensor element 1.

Lead wires 22 of the heat sensor element 1 are connected to the lower side of the lead frames 20. Further, a coating member 23 is provided by potting of adhesives or the like to cover the entire portion of the heat sensor element 1 and the lead wires 22. Thereby, the heat sensor element 1 and the lead wires 22 are sealed so that they are not exposed to the ambient air.

Further, the unit body 21 is of a shape having a flange at the center portion thereof to secure fixing at the time when it is plastic-formed integrally with the molded body 14 as shown in FIG. 1.

A description will now be given with respect to assembling of the detector of the present invention as shown in FIGS. 1 to 5 and its function at the time of its use.

First, at the time of assembling, the element unit 11 is as shown in FIG. 5 previously prepared as one component part. Then the element unit 11 as shown in FIG. 5 is set on a mold when the molded body 14 is to be plastic-formed. At the same time, the pair of fitting members 12 are set on the mold. In this state, the so-called insert molding is formed to prepare the molded body 14 integrally having the element unit 11 and the fitting members 12 as one component part.

Thereafter, assembling work follows, where, as shown in FIG. 1, the circuit board 16 on which implanting of parts has been completed is inserted into the circuit accommodation portion 15 of the molded body 14. Then, the lead frame of the element unit I1 and The vertical portion 12*d* of the fitting member 12 are fitted to the circuit pattern and fixed thereto by soldering. Then, assembling is completed by fixing it to the outer cover 13 as shown in FIG. 2 by screws 26 at four points thereof.

In such assembled state, both the element unit 11 and the fitting members 12 facing the circuit accommodation portion 15 are plastic-formed integrally with the molded body 14. Thus, no gap occurs at this portion and entering of moisture from the outside may be almost completely prevented. On the other hand, with respect to the upper side of the circuit accommodation portion 15, airtightness thereof may be securely kept by the construction where the back side cover 17 is fastened thereto via the O-ring 24 by screws.

Further, the assembling work consists fundamentally of assembling of the circuit board 16 and mounting of the back side cover 17 onto the molded body 14. Simple assembling process thus suffices without depending on manual operation so that automatization of assembling is possible.

Figure 6:
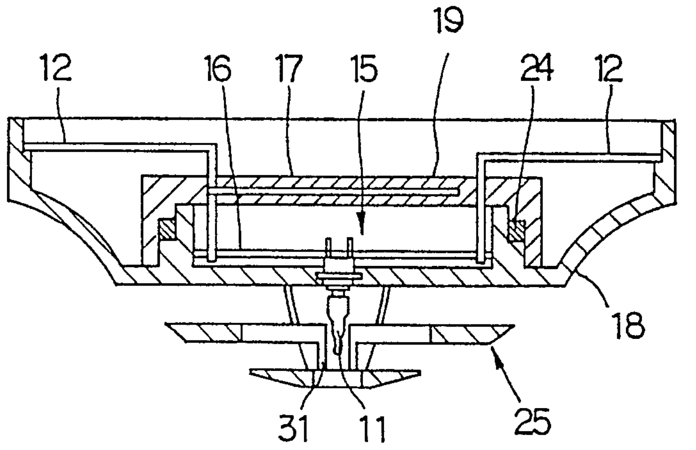
FIG. 6 is a sectional view showing a second embodiment of the present invention.

FIG. 6 shows an exemplary construction of a second embodiment of the present invention, which is characterized in that fitting members 12 are insert-molded into a back side cover in this embodiment.

Referring to FIG. 6, a detector body 18 is of a shape integrally combining the molded body 14 and the outer cover 13 as shown in the embodiment of FIG. 1. An element unit 11 is plastic-formed integrally with the detector body 18 by mold forming.

A circuit board 16 on which a sensor circuit is implemented is incorporated into the circuit accommodation portion 15 inside the detector body 18 and the lead frame of the element unit 11 is fixed thereto by soldering.

On the other hand, in this embodiment, a pair of fitting members 12 are provided by mold-forming integrally with the back side cover 17 which is mounted on the upper portion of the circuit accommodation portion 15 via an O-ring 24. Further, in this embodiment, a disc-like shield plate 19 is embedded by mold-forming into the back side cover 17 where it is connected to one of the fitting members 12. This shield plate 19 is provided to effect electrostatic shielding for the circuit board 16 which is incorporated into the circuit accommodation portion 15.

Figure 7:
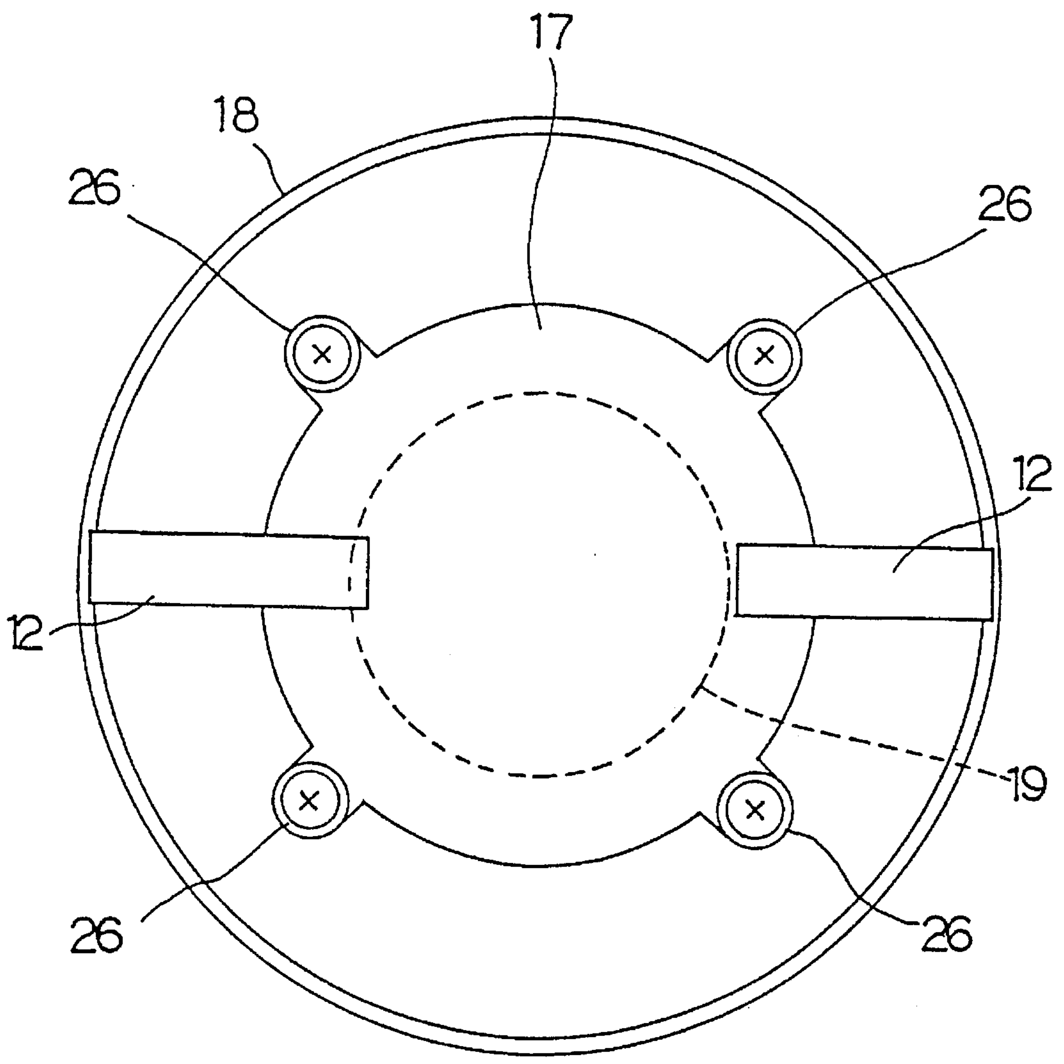
FIG. 7 is a plan view as seen from the ceiling side of FIG. 6.

FIG. 7 is a plan view as seen from the top side of FIG. 6. In this case, the back side over 17 having the fitting members 12 plastic-formed thereon is fixed at four points thereof to the detector body 18 by screws 26. Further, the shield plate 19 is embedded into the back side cover 17 in the state where it is connected to the left side fitting member 12.

In the embodiment of FIGS. 6 and 7, also, the detector body 18 formed integrally with the element unit 11, comprises one component part. Also, the back side cover 17 formed integrally with the fitting members 12 and the shield plate 19 comprises one component part. Further, since assembling of three components parts including the circuit board 16 in addition to these is adequate for this purpose, automatization of assembling thereof is possible and, furthermore, airtightness of the circuit accommodation portion 15 may be substantially completely secured.

It should be noted that, while in the above embodiment, the molded body 14 and the outer cover 13 are formed integrally with each other, in is naturally possible similarly as in the embodiment of FIG. 1, to form the molded body 14 and the outer cover 13 separately and then to combine them with each other.

Figure 8:
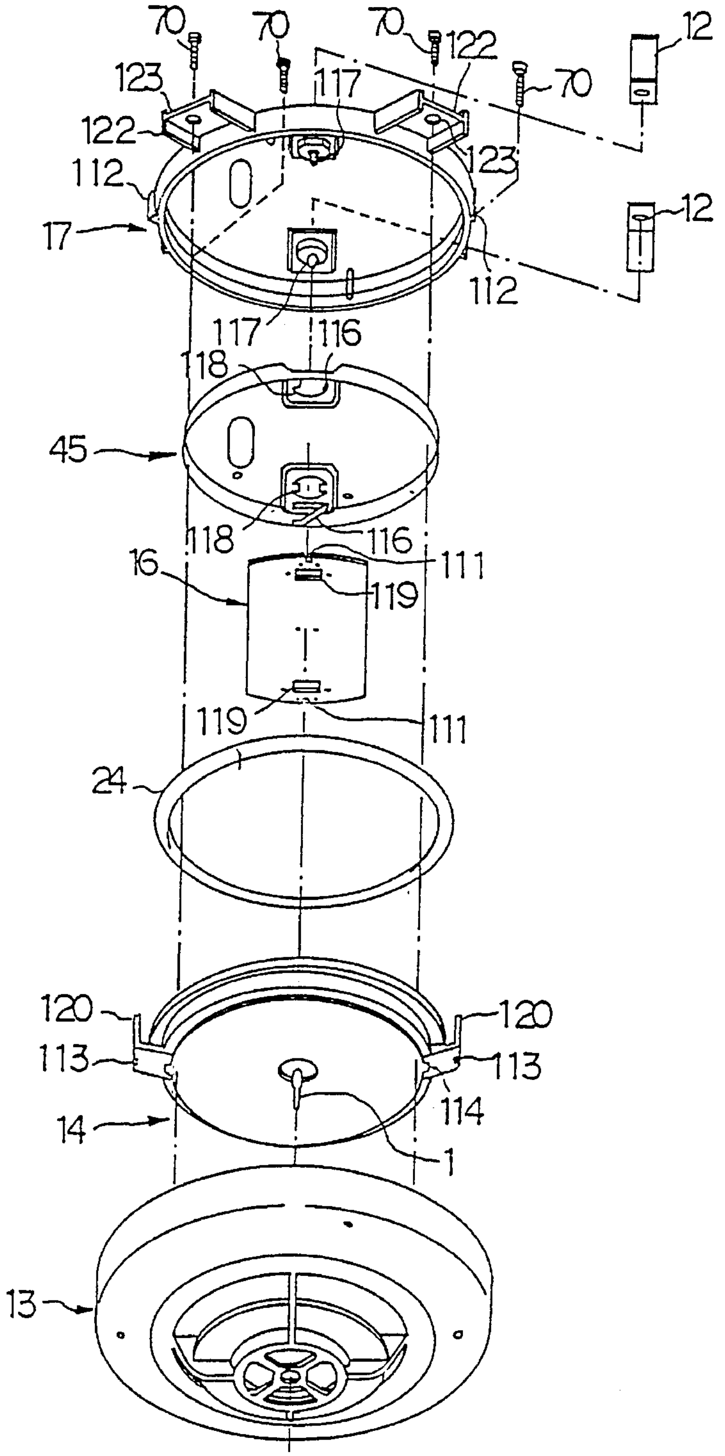
FIG. 8 is an exploded view of an assembly showing a third embodiment of the present invention.

FIG. 8 is an exploded view of the assembly showing a third embodiment of the thermal detector of the present invention.

The present embodiment is characterized in its structure for positioning the respective component parts in the thermal detector.

Referring to FIG. 8, the thermal detector of the present embodiment is constructed by placing an outer cover 13, a molded body 14, an O-ring 24, a circuit board 16, a shield case 45 and a back side cover 17 upon another in this order from the lower side thereof. The central lower portion of the molded body 14 has a heat sensor element 1 such as a thermistor integrally formed thereon. Further, a contacting piece 116 is raised on the shield case 45 so that it can electrically contact a grounded pattern of the circuit board 16.

Further, a pair of terminal pins 117 are provided on the back side cover 17 and a pair of fitting members 12 are fixed to the upper portion of the terminal pins 117. A through hole 118 is opened at the position of the shield case facing the terminal pin 117 on the back side cover 17. At the portion of the circuit board 16 facing the terminal pin 117 via the through hole 118, a terminal receiver (not shown) for fitting against and pushing in of the terminal end of the pin is provided on a pin hole 119, which is opened toward the lower side thereof.

In the present invention, the following positioning structure is provided for a thermal detector formed of the outer cover 13, the molded body 14, the circuit board 16, the shield case 45 and the back side cover 17.

Figure 9:
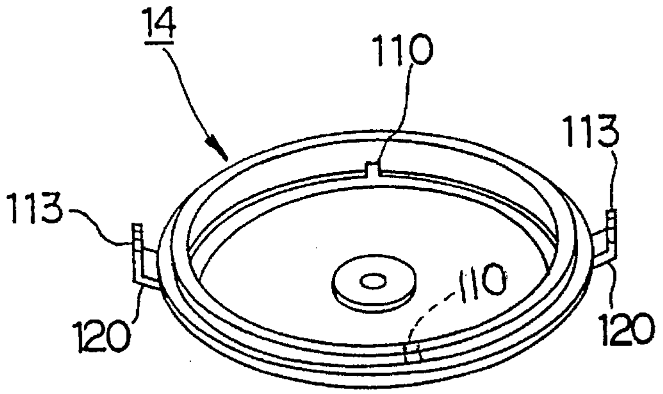
FIG. 9 is a view showing the inside of the body of FIG. 8.

First, as is apparent from the state shown in FIG. 9, a first positioning projection 110 is provided at two points along the inside of the molded body 14. Corresponding to the first positioning projection 110 on the molded body 14, a first positioning groove 111 is formed at two points on the side surface of the circuit board 16, as shown in FIG. 8. Thus, by fitting the first positioning grooves 111 of the circuit board 16 onto the first positioning projections 110 of the molded body 14, the two may be positioned with respect to each other.

Further, a positioning members 120 is extended at the two sides of the molded body 14. As can be seen from FIG. 2, a second positioning groove 113 having an upward opening is formed on the positioning member 120. Correspondingly to the second positioning groove 113 of the molded body 14, a second positioning projection 112 is integrally formed at two points on the side surface of the back side cover 17, as shown in FIG. 8. Thus, by fitting the second positioning grooves of the molded body 14 and the second positioning projections 112 of the back side cover 17 with respect to each other, the two may be positioned at their regular positions.

Figure 10:
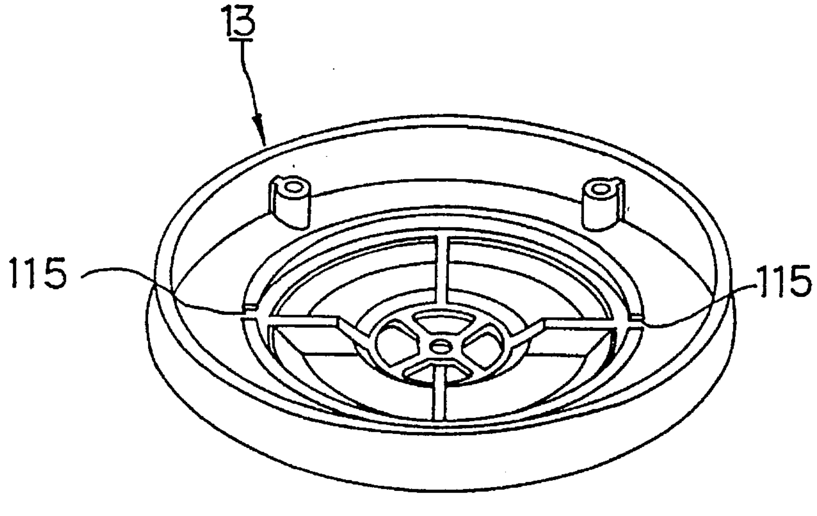
FIG. 10 is a view showing the inside of the outer cover of FIG. 8.
Figure 11:
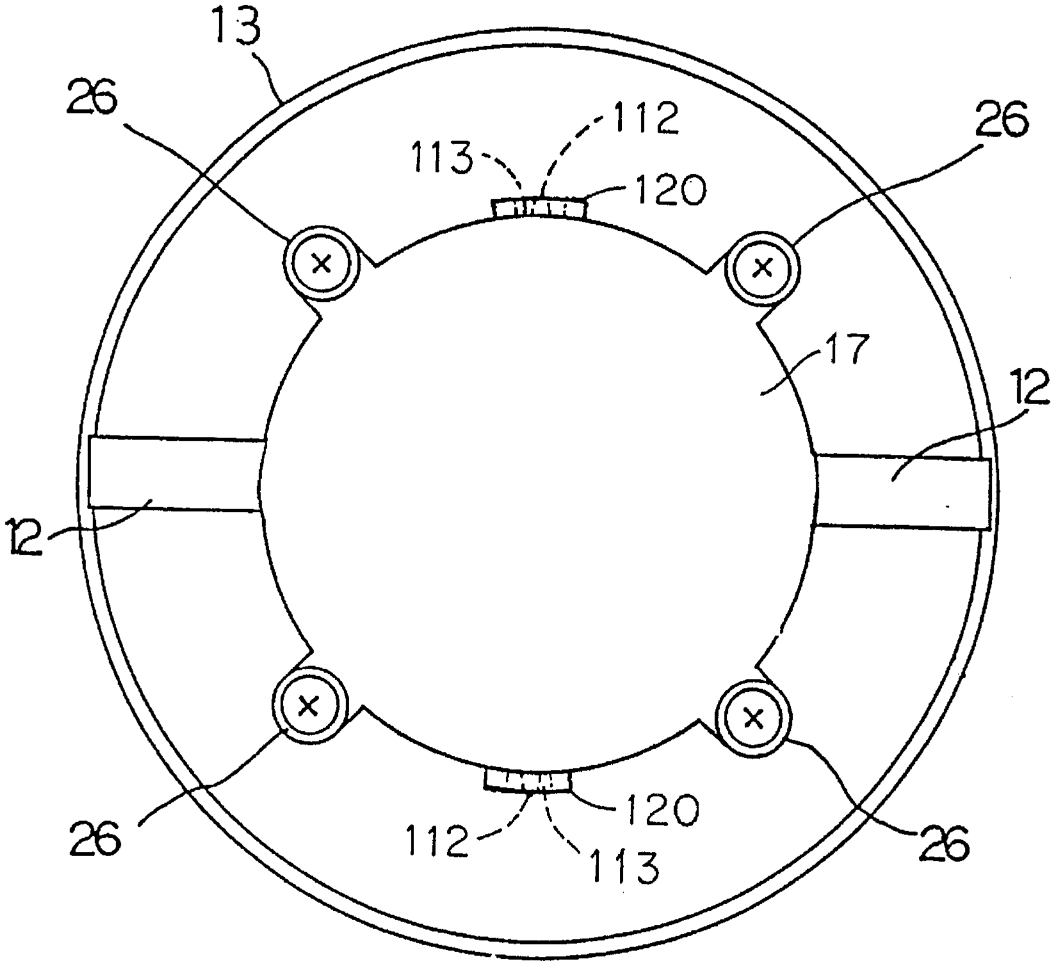
FIG. 11 is a plan view seen from the top of FIG. 1 in another embodiment.
Figure 12:
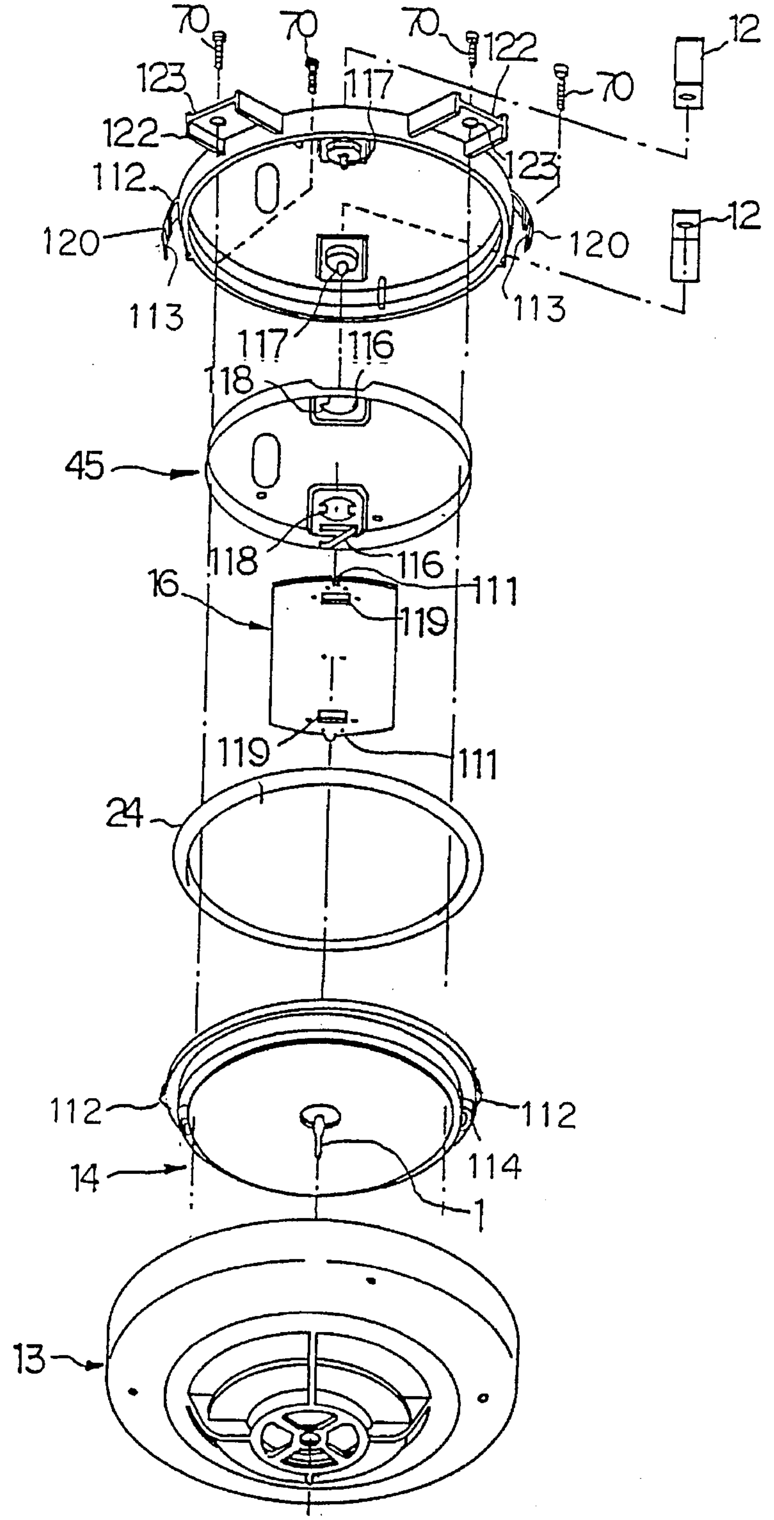
FIG. 12 is an exploded view of an assembly of a further embodiment.
Figure 13:
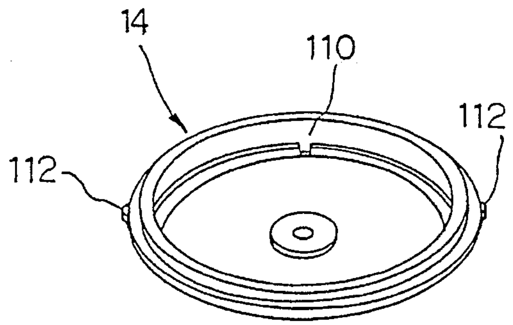
FIG. 13 is a view showing the inside of the body of FIG. 12.
Figure 14:
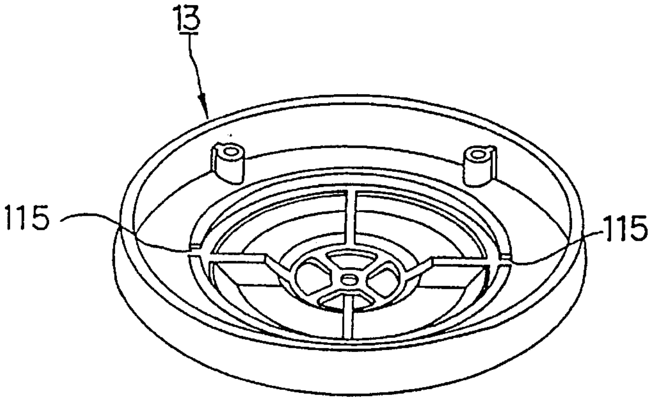
FIG. 14 is a view showing the inside of the outer cover of FIG. 12.
Figure 15:
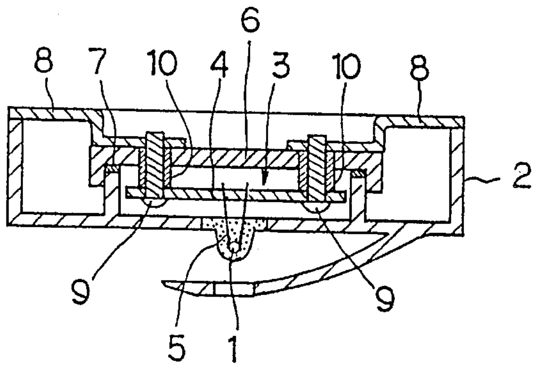
Fig. 15 PRIOR ART
FIG. 15 is a sectional view showing a conventional detector.

Furthermore, a third positioning projection 114 is provided at the base end portion of each positioning member 120 of the molded body 14. As is apparent from the outer cover 13 of which the inside is shown in FIG. 10, a third positioning groove 115 is formed at two points on the inside of the outer cover 13 correspondingly to the third positioning projections 114. Thus, by fitting the third positioning projections 114 into the third positioning grooves 115 at the inside of the outer cover 13, the two may be positioned at their regular positions.

As described, in the present invention, the positioning projections and the positioning grooves are provided, which position the circuit board 16, the back side cover 17, and the outer cover 13 with respect to the molded body 14, so that their relative position becomes the regular relative position. Thus, by fitting the positioning projections and the positioning grooves, the relative position of the circuit board 16, the back side cover 17 and the outer cover 13 with respect to the molded body 14 may be uniquely determined.

A detailed description will now be given with respect to the assembling process of the thermal detector of the present invention as shown in FIG. 8.

An the time of assembling the thermal detector, the shield case 45 is previously incorporated and fixed to the inside of the back side cover 17 and the fitting member 12 is also previously fixed to the side opposing the terminal pin 117. Further, electric component parts for forming the sensor circuit are previously implanted onto the circuit board 16.

In this condition, at Step 1 of the assembling operation, the first positioning groove 111 on the side surface of the circuit board 16 is fitted onto the first positioning projection 110 on the inside of the molded body 14, as shown in an extracted manner in FIG. 9, to temporarily assemble the circuit board 16 onto the molded body 14.

Next, at Step 2, in the state where the O-ring 24 is fitted onto the upper portion of the molded body 14, the back side cover 17 is assembled thereto, which has the shield case 45 and the fitting member 12 previously assembled thereon. At this time, positioning and temporary assembling of the two sections are performed such that the second positioning groove 113 of the positioning member 120 extended at the side surface of the molded body 14 is fitted onto the second positioning projection 112 on the side surface of the back side cover 17.

Next, at Step 3, the assembly of molded body 14, O-ring 24, circuit board 16, shield case 45, back side cover 17 and fitting member 12 is assembled onto the outer cover 13. At this time, the third positioning projection 113 at the lower portion of the molded body 14 is positioned to the third positioning groove 115 at the inside of the outer cover 13 shown in FIG. 10.

By the above-described Steps 1 to 3, a temporarily assembled state is obtained of the respective members of outer cover 13, molded body 14, O-ring 24, circuit board 16, shield case 45, back side cover 17 and fitting member 12.

Next, at Step 4, by way of through holes 123 formed at the four extended portions 122 of the back side cover 17 as shown in FIG. 8, tapping screws are screwed into through holes provided on the inside of the outer cover 13 while cutting a thread therein. The back side cover 17 is then fastened with respect to the outer cover 13, to integrally fix in place molded body 14, O-ring, circuit board 16 and shield case 45 thereto, which are positioned between them.

As described, in the present invention, assembling work may be performed by simple operation such that the circuit board 16, the back side cover 17 and the outer cover 13 around the molded body 14 are brought into their temporarily assembled state where they are positioned at their regular positions by fitting of the positioning grooves and the positioning projections, and, at last, they are fixed into one by screwing, using the tapping screws 70.

It should be noted that the relation of a positioning groove and a positioning projection for positioning the circuit board 16, the back side cover 17 and the outer cover 13 with respect to the molded body 14 in the above embodiment may be such that one of them is formed on the side of the molded body 14, and the other is formed on the circuit board 16, the back side cover 17 or the outer cover 13. In such a case, the decision as to which side the positioning grooves and the positioning projections are, respectively, to be provided is not limited by the above embodiment.

In summary, the present invention provides for a thermal detector in which a detector body is on an outer cover and is integrally formed with a heat sensor element projected to the outside thereof. A printed board on the detector body carries a sensor circuit. The printed board has a back side cover with securing members. A first positioning projection is provided on one side of the detector body and the printed circuit board, and a first positioning groove receives the first positioning projection on another side of the detector body and the printed board. A second positioning projection is provided on one of the detector body and the back side cover and a second positioning groove is provided on the other for receiving the second positioning projection. A third positioning groove receives a third positioning projection and is located on one of an outer cover side of the detector body and a detector body side of the outer cover. The printed board is positioned on the detector body and is secured by the first positioning projection and the first positioning groove. The back side cover is positioned on a reverse side of the detector body with the printed board, and is secured by the second positioning projection and the second positioning groove. The outer cover is positioned on the outer cover side of the detector body and is secured by the third positioning projection and the third positioning groove. The back side cover, the printed board, and the detector body as well as the outer cover are secured together as one body by screw devices.

In a further embodiment, the thermal detector, according to the present invention, has the detector body on the outer cover and is integrally formed with a heat sensor element projected to the outside thereof. A printed board on the detector body carries a sensor circuit. A shield case is provided on the printed board. A back side cover is on the printed board with securing members. A first positioning projection is provided on one side of the detector body and the printed board, and a first positioning groove receives the first positioning projection on another side of the detector body and the printed board. A second positioning projection is provided on one of the detector body and the back side cover and a second positioning groove on the other for receiving the second positioning projection. A third positioning projection is provided on one of an outer cover side of the detector body and a detector body side of the outer cover. A third positioning groove receives the third positioning projection. The printed board is positioned on the detector body and is secured by the first positioning projection and the first positioning groove. The back side cover has the shield case and is positioned on a reverse side of the detector body with the printed board secured by the second positioning projection and the second positioning groove. The outer cover is positioned on the outer cover side of the detector body and is secured by the third positioning projection and the third positioning groove. The back side cover, the shield case, the printed board, the detector body and the outer cover are secured together as one body by screw devices.

What is claimed is:

1. A thermal detector comprising: an outer cover; a detector body on said outer cover and integrally formed with a heat sensor element projected to the outside thereof; a printed board on said detector body, and carrying a sensor circuit; a back side cover on said printed board, with securing members;

a first positioning projection on one side of one of said detector body and said printed board, and a first positioning groove for receiving the first positioning projection on another side of the other of said detector body and said printed board;

a second positioning projection on one of said detector body and said back side cover and a second positioning groove on the other for receiving said second positioning projection;

a third positioning projection on one of said outer cover and said detector body, and a third positioning groove on the other of said outer cover and said detector body for receiving the third positioning projection;

said printed board being positioned on said detector body and secured by said first positioning projection and said first positioning groove; said back side cover being positioned on a reverse side of the detector body with said printed board and secured by said second positioning projection and said second positioning groove; said outer cover being positioned on an outer cover side of said detector body and secured by said third positioning projection and said third positioning groove;

and said back side cover, said printed board, said detector body and said outer cover being secured together as one body by screw means.

2. A thermal detector comprising: an outer cover; a detector body on said outer cover and integrally formed with a heat sensor element projected to the outside thereof; a printed board on said detector body, and carrying a sensor circuit; a shield case on said printed board; a back side cover, on said printed board, with securing members;

a first positioning projection on one side of one of said detector body and said printed board, and a first positioning groove for receiving the first positioning projection on another side of the other of said detector body and said printed board;

a second positioning projection on one of said detector body and said back side cover and a second positioning groove on the other for receiving said second positioning projection;

a third positioning projection on one of a said outer cover and said detector body, and a third positioning groove on the other of said outer cover and said detector body for receiving the third positioning projection;

said printed board being positioned on said detector body and secured by said first positioning projection and said first positioning groove; said back side cover having said shield case and being positioned on a reverse side of said detector body with said printed board and secured by said second positioning projection and said second positioning groove; said outer cover being positioned on an outer cover side of said detector body and secured by said third positioning projection and the third positioning groove; said back side cover, said shield case, said printed board, said detector body and said outer cover being secured together as one body by screw means.

* * * * *